June 19, 1934.  R. F. MALLINA  1,963,753
SOUND MOTION PICTURE SYSTEM
Filed Aug. 21, 1931   3 Sheets-Sheet 1
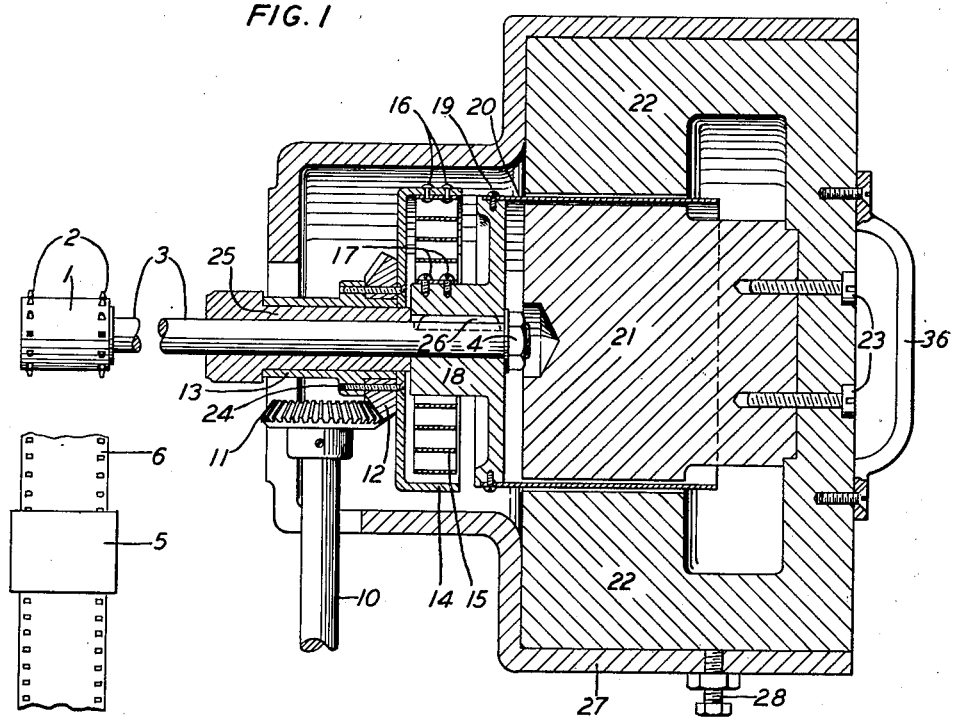
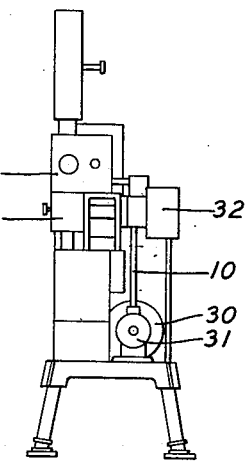
INVENTOR
R. F. MALLINA
BY
G. H. Heydt
ATTORNEY June 19, 1934.　　　R. F. MALLINA　　　1,963,753
SOUND MOTION PICTURE SYSTEM
Filed Aug. 21, 1931　　　3 Sheets-Sheet 2

INVENTOR
R. F. MALLINA
BY
ATTORNEY

June 19, 1934.    R. F. MALLINA    1,963,753
SOUND MOTION PICTURE SYSTEM
Filed Aug. 21, 1931    3 Sheets-Sheet 3

INVENTOR
R. F. MALLINA
BY
G. H. Hyatt
ATTORNEY

UNITED STATES PATENT OFFICE 1,963,753

SOUND MOTION PICTURE SYSTEM

Rudolph F. Mallina, New York, N. Y., assignor to Bell Telephone Laboratories, Incorporated, New York, N. Y., a corporation of New York Application August 21, 1931, Serial No. 558,442

11 Claims. (Cl. 271—2.3)

This invention relates to sound picture apparatus and more particularly to a control mechanism for maintaining a film at constant velocity for sound translation.

The mechanism for recording and reproducing systems ordinarily involves driving an intermittent motion and a sound film sprocket from a common driving source. The intermittent motion intermittently positions the film before lenses for photographic exposure or projection to a screen. At the same time a sprocket must move the film at unvarying velocity before sound translating apparatus. Variations in the velocity of the sound film cause sound pitch variations. The normal ear can detect sound pitch variations which are greater than 0.3%. Consequently for satisfactory sound translation the variation in pitch must be maintained below 0.3%.

In mechanisms of this general character which use the aforementioned common driving source a variety of irregularities exist. The majority of these irregularities are produced by infinitesimal imperfections in the parts of the driving mechanism. These imperfections, however, need not necessarily be great to affect sound translation. Irregularities may be grouped into high and low frequencies according to the effect produced. The high frequency irregularities are caused by gear teeth and extraneous vibrations of various parts of the driving mechanism. The low frequency irregularities are caused by cyclic modulations in speed due to imperfections in the bearings, imperfect layout of gear teeth, eccentricities, etc.

It is apparent that if irregularities of movement are introduced during recording, the sound record will not be uniform and unless the same identical irregularities are introduced when this film record is reproduced, the effect will be noticeable. On the other hand, if a sound record is perfectly recorded and irregularities of film motion are introduced during reproduction, distorted sounds are produced.

One method which has been used to minimize the effect of irregularities in the driving mechanism is to mount a heavy fly-wheel on the sound sprocket shaft. The function of this fly-wheel is to absorb or give out mechanical energy in response to fluctuations in applied torque, thereby minimizing the fluctuations. The fly-wheel is not as effective in response to low frequency irregularities as it is to the higher frequency irregularities. The limiting factor determining the size and mass of the fly-wheel is therefore the low frequency group of disturbances. A flywheel must therefore be of large mass to reduce the effect of these low frequency disturbances. This adds materially to the weight of a sound picture camera or reproducing apparatus. In order that the fly-wheel be made effective for absorbing and giving out energy it must be coupled directly to the sound sprocket. Because of the momentum of the fly-wheel this brings about certain difficulties in starting and stopping recording and reproducing apparatus when a sudden change is made necessary. It is, therefore, highly desirable to have negligible inertia in a sound picture recording or reproducing mechanism.

The object of this invention, is, therefore, to provide in a sound picture apparatus a resistance terminated filter of inconsiderable mass having a particular characteristic which provides an accurate balance between interacting forces to produce uniform velocity of movement of a film for sound translation.

One embodiment of this invention resides in controlling velocity changes by a resistance terminated filter, the resistance being provided through the agency of an eddy-current magnetic device. An electric motor operated, for example, at 20 revolutions per second drives the mechanism of the sound picture apparatus which includes the intermittent motion and a sprocket for regulating the movement of the film past the sound modulator and the rotation thereof must be maintained uniform at all times to prevent distortion of sound. For convenience this sprocket will be hereinafter known as the sound sprocket. A member of particular elasticity is placed between the driving motor and the shaft on which the sound sprocket is mounted. A number of driving links comprising shafts and gears are of necessity introduced between the motor and the driven end of the elastic member. All of the mechanisms of the sound picture apparatus, including the intermittent motion, are driven through the agency of these shafts and gears. Any of these devices, including the motor, gears, shafts or driven mechanism, may by slight imperfections cause velocity changes. The resistance of the eddy-current device is such as to permit the velocity changes to be present in the elastic member in the form of angular velocity changes but is such as to prevent the transmission of these angular velocity changes to the sound sprocket. The elastic member is such as to react to the velocity changes under the control of the resistance member, In the consideration of this problem the constant or uniform velocity of the sound sprocket must be taken as a zero factor. The uniform velocity may be defined as that which would be obtained if no irregularities existed to introduce velocity changes. Thus, in the devices of this invention, velocity changes only are of interest. These velocity changes are of various frequencies depending upon the cyclic velocity of the member producing the change.

In addition to the velocity changes introduced by irregularities of gears and shafts between the motor and the elastic member, other irregularities due to variations in film resistance must be taken into consideration. These variations in film resistance occur as the film passes through the sound modulator gate. The film variations produce angular velocity changes at the sound sprocket unless some interacting force or load is provided which is great enough to make the variations in film resistance negligible by comparison.

The particular characteristic of this resistance terminated filter is such that angular velocity variations produced by the driving mechanism and by film load variations are prevented from producing an audible pitch variation in translated sounds. This characteristic will be better understood from the formula given in the following detail description.

Fig. 1 is a view in cross section of an eddy-current resistance terminated filter according to the invention;

Fig. 3 illustrates the assembly of a resistance terminated filter of either type in a projecting machine;

Figure 2:
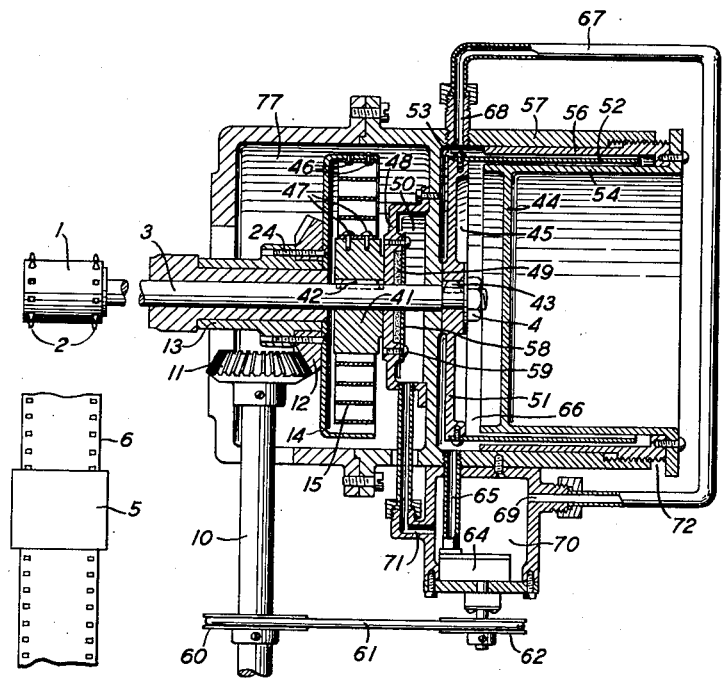
Fig. 2 is a view in cross section of a viscosity resistance terminated filter having the same characteristic as the eddy-current filter of Fig. 1.

As previously set forth, an electric motor 30 as shown in Fig. 3 is used as a common power source for driving all of the mechanism of a sound picture machine. This includes an intermittent motion of conventional design in projector head 33 and a sound sprocket such as 1 shown in Figs. 1 and 2 which is mounted in sound unit 34 of Fig. 3. Shaft 10 shown in Figs. 1, 2 and 3 is driven by motor 30 through gears mounted in gear box 31. Gear 11 connected to this shaft drives gear 12 for propelling the sound sprocket 1 through the agency of an elastic member comprising spring 15 and the associated housings. The gear 12 is fastened by screws 24 to a sleeve 13. The screws 24 also fasten the sleeve 13 and gear 12 to the spring housing 14.

Referring now to Fig. 1, the spring 15 is shown interconnecting housing 14 and the hub of member 18 to form the elasticity between the driving mechanism and the sound sprocket. The spring 15 is fastened at one end to the housing 14 by the rivets 16. The other end of spring 15 is fastened to the hub of member 18 by screws 17. The member 18 is rigidly fastened to the sound sprocket shaft 3 by key 26. The sound sprocket 1 is rigidly fastened to the shaft 3 by a key not shown.

Shaft 3 and sound sprocket 1 are thus driven through the agency of an elastic member. This member responds to velocity changes introduced by the motor, gear teeth, or other mechanisms in the mechanical driving linkage.

The resistance member is mounted at the other end of shaft 3. This resistance member comprises magnets 21 and 22 and a drum 20 which is fastened to the member 18 for rotation therewith by screws 19. The member 18 and drum 20 are made as light as possible. The mass thereof is only sufficient to provide mechanical strength to withstand the strain of the rotary motion required and the strain of resistance between the drum and the magnet pole pieces. The magnet 22 is fitted into housing 27. The magnet 21 is fitted into a recess in magnet 22 and is held in place by screws 23. The complete unit comprising magnets 21 and 22 may be adjusted with relation to drum 20 by sliding the magnets in housing 27. A handle 36 is provided for this purpose. The magnet unit is held in position by lock screw 28. It should be considered within the scope of the invention to use an electro magnet in place of the magnets shown. In this form the resistance may be varied by varying the exciting current.

A film 6 is shown associated with sprocket 1. The film is drawn past a light modulator through the agency of sound sprocket teeth 2. A film pad and gate of conventional design are shown diagrammatically at 5. A friction load is ordinarily exerted on the film at the point of sound translation. This may be exerted by a film pad as shown or by other well known arrangements. Ample allowance is made in the power of the motor and guiding mechanism for this load and also for added load produced by film variations. In view of the necessity of splicing films, it is difficult to prevent a variation in film load at this point. Warping of the film and slight accumulation of dirt on the film due to film abrasion are other factors to be considered. This variation in film load may be assumed as ± 50 grams maximum. This does not produce a great change in the velocity of the film. It is, however, sufficient to produce an audible change in pitch of the sounds translated unless the sprocket velocity is properly regulated. In order to overcome this velocity change in the film, the resistance or load placed on the sound sprocket 1 by the rotation of drum 20 in its magnetic field is made several hundred times greater than the greatest load variation at the point of sound translation. The space relation between drum 20 and the adjacent surfaces of magnets 21 and 22 and the magnetic forces are so fixed as to produce a given resistance for a filter according to the characteristic hereinafter set forth.

Since velocity variations of the sound sprocket produce a variation of pitch in the translated sound, it is necessary to determine the velocity variation present which is due to a certain torque variation $\Delta F$ due to film load disturbances. According to experiment, the ear can just about distinguish a pitch variation of 0.3%. The maximum velocity variation occurs at resonance frequency. The resonance frequency peak must therefore be produced at a frequency below the frequency which is most disturbing in the sound picture apparatus. In consequence of the foregoing, the stiffness of the elastic member, the mass of the sound sprocket 1, shaft 3 and rotating members 18 and 20, and the resistance between the drum 20 and magnets 21 and 22 must be so fixed as to reduce velocity variations due to film load disturbances below .3%. This stiffness, mass and resistance must also be so fixed that the resonance frequency peak is well below the lowest disturbing frequency. The foregoing is calculated according to the following formula:

$$100\left|\frac{V_3}{V}\right| = \frac{100}{V} \frac{\Delta F}{\sqrt{R^2 - 2MS + \omega^2 M^2 + \frac{S^2}{\omega^2}}}$$

Figure 8:
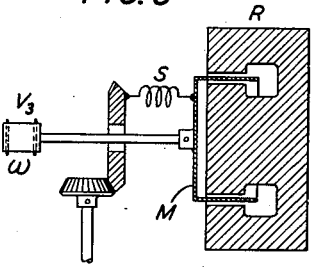
Figure 9:
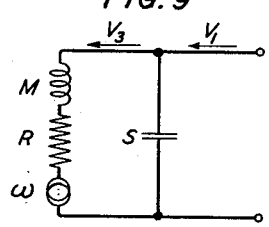
Figure 11:
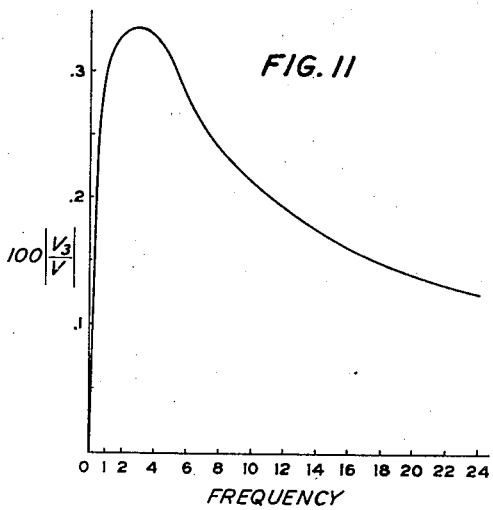
Fig. 11 is a curve showing the percentage change in the pitch of translated sounds.

Figs. 8 and 9 illustrate in schematic form transmission line diagrams of the film variation or load disturbances as represented in this formula. In the foregoing ratio between moment of stiffness, moment of inertia and moment of resistance, the moment of inertia is produced by a mass only made enough to stand the mechanical strain placed on the various members. This moment of inertia, even though very small, must be considered in the calculations for obtaining a particular ratio between the resistance load and the variable film load. In the foregoing formula $V_3$ is the variable angular velocity due to $\Delta F$ and $V$ the theoretical uniform angular velocity of the sprocket shaft. Velocity variations which are the most troublesome in most sound picture apparatus are of a frequency of six cycles per second. The resonance frequency peak of the filter is thus fixed as shown in the curve of Fig. 11 well below a frequency of six per second. In consequence of this, the resonance frequency peak is well below the lowest disturbing frequency and, at the frequency of six cycles per second, the change in pitch, caused by unabsorbed velocity variations, is well below .3%.

As previously set forth, the resistance between the rotating drum 20 and magnets 21 and 22 is fixed as a swamping load as compared with the load variation of the film. The ratio between the interacting forces of the resistance member, velocity variations in the film and velocity variations in the driving mechanism is simultaneously considered. This is set forth in the foregoing wherein the resonance frequency peak is so fixed as to be well below the most disturbing frequency of the driving mechanism which is six cycles per second.

Considering now the attenuation or filtering action for the drive side velocity variations, the following formula may be used to ascertain the exact action for a given ratio between moment of stiffness, moment of inertia of rotating parts, and moment of resistance of the resistance member:

$$\left|\frac{V_2}{V_1}\right| = \frac{\frac{S}{\omega}}{\sqrt{R^2 - 2MS + \omega^2 M^2 + \frac{S^2}{\omega^2}}}$$

In the foregoing formula $V_1$ is the angular velocity input and $V_2$ is the angular velocity output. The ratio $V_2$ over $V_1$ is a measure of the filter action, S is the moment of stiffness of the spring, M the moment of inertia of the sprocket, sprocket shaft and eddy-current drum, and R is the moment of eddy-current resistance. $\omega = 2\pi f$ in which $f=$ the frequency of the disturbing velocity variations.

The foregoing formula and calculations are given as means for regulating the interacting forces of the resistance member and those produced by the velocity variations in order to approach equilibrium at the sound sprocket. In the case of the velocity variations produced by film variations, the resistance load acts to prevent the variations in load transmitted to the sound sprocket from altering its velocity. In the case of the velocity variations in the driving mechanism, the forces produced by the resistance member interact against the forces produced by velocity variations in the driving mechanism. The elastic member is so fixed that it will absorb or attenuate all of the driving mechanism disturbances except those which do not affect a change in pitch of translated sound.

The foregoing calculations may be applied per se to the viscosity resistance terminated filter shown in Fig. 2. The operating mechanism of this structure is as follows: Shaft 10 is driven by the motor 30 as previously described. The gears 11 and 12, sleeve 13, sprocket 1, shaft 3, spring housing 14 and spring 15 are identical with that shown in Fig. 1. One end of the spring is connected to housing 14 by rivets 46, the other end of this spring is connected to hub member 41 by screws 47. The hub member 41 is rigidly connected to the shaft 3 by key 42. In this mechanism, a housing 57 is provided having a reservoir 45 which is filled with a viscous fluid, preferably oil. The rotating member 51 is rigidly fastened to shaft 3 by key 43 and is held in place by nut 4. A drum 52 is fastened to member 51 by screws 53. This drum is accurately positioned in a recess between walls 54 and 56 of housing 44. The space relations between the surfaces of drum 52 and walls 54 and 56 are arranged to produce a particular resistance value corresponding to that of the eddy-current resistance terminated filter of Fig. 1.

Screw threads 72 are provided for adjusting housing 44 with relation to housing 57 and rotatable drum 52.

A circulating system is provided for the viscous fluid. This comprises a pump 64 driven by belt 61 through the agency of pulleys 60 and 62. The oil is circulated through the encasement by pressure through tubing 65. This oil is forced through orifice 68 and returns by way of tubing 67 to the oil reservoir 70. Any oil which leaks by shaft 3 into the encasement 50 is drained into the reservoir 70 through tubing 71. A back plate or housing 48 is provided for retaining a packing 49 to prevent oil leakage.

In this viscosity resistance terminated filter as in the one shown in Fig. 1, a film 6 is drawn past the light modulator by sprockets 2 of the sprocket wheel 1. A film pad 5 is diagrammatically shown. This film pad is of conventional design for exerting pressure on the film at the light modulating unit.

Figure 4:
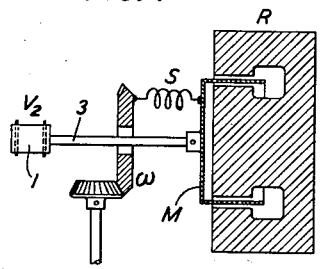
Figs. 4 to 9 are mechanical transmission line diagrams.
Figure 6:
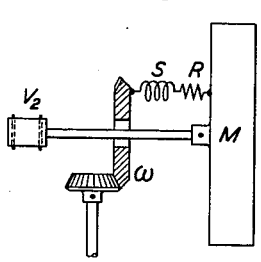
Figure 5:
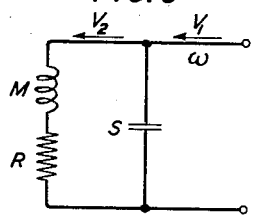
Figure 7:
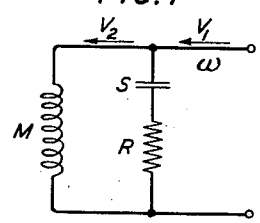

In Figs. 4 to 7 inclusive a comparison has been made between the resistance terminated filter of the invention and the mass terminated filter using a fly-wheel. These drawings have been made in the schematic form of mechanical transmission line diagrams. In Figs. 4 and 5 a diagram of the resistance terminated filter is shown in which M represents the moment of inertia of the sprocket, sprocket shaft, and drum, R is the moment of resistance and S is the moment of stiffness of the spring. In Figs. 6 and 7, M is the mass of the fly-wheel which in this case is the controlling factor for minimizing velocity changes at the sound sprocket, S represents the moment of stiffness of the spring, and R represents resistance which is coupled with the elastic member. In this type of arrangement, the resistance in the form of a viscous dampener is coupled with the elastic member in order to prevent fly-wheel oscillations from so called hunting. In the resistance terminated filters Figs. 1 and 2 made according to the characteristic set forth no viscous dampener or resistance is required or used with the elastic member. $V_1$ shown in these diagrams represents velocity input or impressed velocity which should be interpreted as change in velocity and $V_2$ represents velocity output at the sound sprocket which should also be interpreted as change in velocity.

Figure 10:
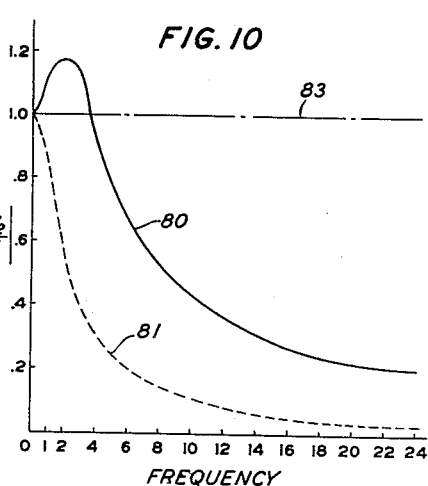
Fig. 10 illustrates the frequency characteristics for differently arranged filters.

A diagram has been shown in Fig. 10 to indicate the angular velocity variations of the sound sprocket in sound picture apparatus using either the resistance terminated filter according to the invention diagrammatically shown in Figs. 4 and 5, or the mass terminated filter diagrammatically shown in Figs. 6 and 7. These curves indicate the result of calculations and measurements made with devices as used in sound picture apparatus. This diagram, Fig. 10, represents angulalr velocity changes at the sound sprocket in response to velocity changes in the driving mechanism and in the film. These velocity changes are of the various frequencies as shown. In this diagram $V_1$ indicates impressed angular velocity and $V_2$ represents angular sprocket velocity.

The amplitude or response to velocity changes is shown by the curves starting at 1.0. This is the theoretical point on the zero abscissa at which no impressed velocity changes occur. At a point adjacent to the zero abscissa, a very low ratio of impressed velocity changes occur, the consequent response to velocity changes at this point is unity or 100%. Fortunately, there are no velocity changes of this character to be considered. As hereinbefore set forth, the velocity changes which are the most difficult to eliminate in sound picture mechanism are the low frequencies. For this reason any filtering arrangement must be so arranged as to produce neglible response at the lowest disturbing frequency. If the response at the sound sprocket is such as to produce a variation of pitch in the translated sound less than .3%, they are considered to have been satisfactorily eliminated.

Curve 81 represents the response characteristic to velocity changes when a resistance terminated filter according to the invention and according to the diagrammatic illustration of Figs. 4 and 5 is used. It will be noted that according to this curve some response by the sprocket wheel to velocity changes at the frequency of six is produced. These velocity changes are, however, such as to produce no audible change in the pitch of sounds translated.

A second curve 80 is shown to illustrate the characteristic of the mass terminated filter diagrammatically illustrated in Figs. 6 and 7. It will be noted in the case of the mass or fly-wheel terminate filter that the transmission of velocity variations is closer to unity than in the case of the resistance terminated filter. This is particularly true at the lower frequencies which are inherently most troublesome in sound translation. At the frequency of six per second it will be apparent that a greater angular velocity change is produced at the sprocket than is produced when the resistance terminated filter is used. This is partly due to the inherent rise in the curve at the lower frequencies due to the fact that resonance occurs in the mass terminated filter as shown in this curve.

The operating speed of a motor for driving a sound picture mechanism may be assumed as approximately 20 revolutions per second. At the present time it has been impossible to make a motor without some slight irregularities. In consequence of this there are slight oscillations transmitted to the driving mechanism by the motor. These oscillations or irregularities occur at the frequency of 20 per second. These irregularities and the irregularities of higher frequencies are more easily eliminated both in the mass terminated filter and the resistance terminated filter than the low frequencies. It is, however, apparent from the curve 81 that the velocity changes at frequencies from 6 to 20 have practically no effect upon the sound sprocket when the filter according to the invention is used.

The resistance terminated filter in addition to its advantage in filtering out frequency disturbances, is also subject to less disturbance from unseen and uncontrollable factors which inherently cause velocity changes. Such disturbances are produced by back-lash of gears between the motor and the filter, flexibility of couplings and shafts between the motor and the filter, worn bearings and other unforeseen eccentricities.

The filters disclosed herein have been shown as typical resistance terminated filters which may be made for eliminating velocity variations according to the characteristic set forth herein. Other modifications may be made according to this filter characteristic.

What is claimed is:

1. In a film driving mechanism, a cylinder arranged to move said film past a given point, a drive of variable velocity, and a resistance terminated filter of a given characteristic for controlling uniform velocity of said cylinder comprising an elasticity having no resistance value, interposed between said drive and said cylinder and a terminated resistance formed by a constantly rotating drum of inconsiderable mass and a stationary encasement for said drum arranged for a particular resistance to the rotation of said drum according to said characteristic.

2. In a film driving mechanism, a cylinder arranged to move said film past a given point, a drive of variable velocity and a resistance terminated filter of a given characteristic for controlling uniform velocity of said cylinder comprising an elasticity having no resistance value, interposed between said drive and said cylinder and a terminated resistance formed by a constantly rotating drum of inconsiderable mass, a stationary encasement for said drum arranged for a particular resistance to the rotation of said drum according to said characteristic, and a space relation between the surfaces of said drum and the surfaces of said encasement according to said characteristic.

3. In a film driving mechanism, a cylinder arranged to move said film past a given point, a drive of variable velocity and a resistance terminated filter for controlling uniform movement of said cylinder, comprising an elastic member interposed between said drive and said cylinder, a terminal resistance formed by a constantly rotating drum connected to said cylinder, and a stationary encasement for said drum, in which the ratio of angular velocity output over angular velocity input is $$\left|\frac{V_2}{V_1}\right| = \frac{\frac{S}{\omega}}{\sqrt{R^2 - 2MS + \omega^2 M^2 + \frac{S^2}{\omega^2}}}$$

in which S equals the moment of stiffness of said elastic member, M equals the negligible moment of inertia of the rotatable drum forming the active member of the resistance terminal rigidly connected to the cylinder, R equals the moment of resistance at the terminal applied at said drum and $\omega=2\pi f$ in which $f$ is the disturbing frequency.

4. In a film driving mechanism, a cylinder arranged to move said film past a given point, a drive of variable velocity and a resistance terminated filter for controlling uniform movement of said cylinder, comprising an elastic member interposed between said drive and said cylinder, an eddy-current terminal resistance formed by a constantly rotating drum connected to said cylinder, and a stationary magnetic encasement for said drum, in which the ratio of angular velocity output over angular velocity input is $$\left|\frac{V_2}{V_1}\right|=\frac{\frac{S}{\omega}}{\sqrt{R^2-2MS+\omega^2M^2+\frac{S^2}{\omega^2}}}$$

in which S equals the moment of stiffness of said elastic member, M equals the negligible moment of inertia of the rotatable drum forming the active member of the resistance terminal rigidly connected to the cylinder, R equals the moment of resistance at the terminal applied at said drum through the agency of an eddy-current device and $\omega=2\pi f$ in which $f$ is the disturbing frequency.

5. In a film driving mechanism, a cylinder arranged to move said film past a given point, a drive of variable velocity and a resistance terminated filter for controlling uniform movement of said cylinder, comprising an elastic member interposed between said drive and said cylinder, a viscous terminal resistance formed by a constantly rotating drum connected to said cylinder, and a stationary encasement for said drum having a viscous fluid therein, in which the ratio of angular velocity output over angular velocity input is $$\left|\frac{V_2}{V_1}\right|=\frac{\frac{S}{\omega}}{\sqrt{R^2-2MS+\omega^2M^2+\frac{S^2}{\omega^2}}}$$

in which S equals the moment of stiffness of said elastic member, M equals the negligible moment of inertia of the rotatable drum forming the active member of the resistance terminal rigidly connected to the cylinder, R equals the moment of resistance at the terminal applied at said drum through the agency of a viscous fluid and $\omega=2\pi f$ in which $f$ is the disturbing frequency.

6. In a film driving mechanism, a sprocket for moving said film past a given point, a shaft on which said sprocket is rigidly mounted, a drive and a resistance terminated filter of a given characteristic for controlling uniform movement of said sprocket comprising an elasticity interposed between said drive and said shaft, a drum of inconsiderable moment of inertia mounted rigidly on the end of said shaft and rotatable therewith, a stationary slotted member into which said drum is fitted with space relation between the surfaces of said drum and the surfaces of said slotted member computed according to said characteristic and a medium acting upon said surfaces to provide resistances according to said characteristic.

7. In a film driving mechanism, a sprocket for moving said film past a given point, a shaft on which said sprocket is rigidly mounted, a drive and a resistance terminated filter of a given characteristic for controlling uniform movement of said sprocket comprising an elasticity interposed between said drive and said sprocket, a shaft, a drum of inconsiderable mass mounted rigidly on the end of said shaft and rotatable therewith, a stationary slotted member into which said drum is fitted with space relation between the surfaces of said drum and the surfaces of said slotted member computed according to said characteristic, a medium acting upon said surfaces to provide a resistance according to said characteristic and means to adjust the relation between said drum and said slot to alter said resistance.

8. In a film driving mechanism, a cylinder arranged to move said film past a given point, a drive of variable velocity and a resistance terminated filter for controlling uniform velocity of said cylinder, comprising an elastic member interposed between said drive and said cylinder, a terminal resistance formed by a thin cylindrical drum connected to said cylinder and a stationary encasement surrounding the surfaces of said drum, and means to adjust the relation of said encasement and said drum to govern the frequencies of the velocity variations which are suppressed to obtain less than .3% pitch variation in sounds translated from said film.

9. In a film driving mechanism, a cylinder arranged to move said film past a given point, a drive of variable velocity, and a resistance terminated filter for controlling uniform velocity of said cylinder, comprising an elastic member interposed between said drive and said cylinder, an eddy-current terminal resistance formed by a thin cylindrical drum connected to said cylinder, and a stationary magnetic encasement for said drum.

10. In a film driving mechanism, a cylinder arranged to move said film past a given point, a drive of variable velocity, and a resistance terminated filter for controlling uniform velocity of said cylinder, comprising an elastic member interposed between said drive and said cylinder, an eddy-current terminal resistance formed by a thin cylindrical drum connected to said cylinder, a stationary magnetic encasement for said drum, and means to adjust the relation of said encasement and drum to alter the magnetic drag of said drum.

11. In a film driving mechanism, a cylinder for moving said film past a given point, a drive of variable velocity for said cylinder, a resistance terminated filter of a given characteristic for controlling uniform movement of said cylinder, comprising an elastic member interposed between said drive and said cylinder, a drum of inconsiderable mass rigidly connected to said cylinder and rotatable therewith, a stationary slotted member into which said drum is fitted with space relation between the surfaces of said drum and the surfaces of said slotted member computed according to said characteristic, a medium acting upon said surfaces to provide said resistance, and means to adjust said slotted member with relation to the drum to alter the frequency of the velocity variations suppressed by said filter.

RUDOLPH F. MALLINA.